US012240985B2

(12) United States Patent
Sasaki et al.

(10) Patent No.: US 12,240,985 B2
(45) Date of Patent: Mar. 4, 2025

(54) INK FOR INK-JET PRINTER OF CHARGE CONTROL TYPE

(71) Applicant: Hitachi Industrial Equipment Systems Co., Ltd., Tokyo (JP)

(72) Inventors: Hiroshi Sasaki, Tokyo (JP); Takuya Otowa, Tokyo (JP); Masahiko Ogino, Tokyo (JP); Keisuke Nagai, Tokyo (JP); Tamaki Wada, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 978 days.

(21) Appl. No.: 16/967,810

(22) PCT Filed: Feb. 20, 2019

(86) PCT No.: PCT/JP2019/006203
§ 371 (c)(1),
(2) Date: Aug. 6, 2020

(87) PCT Pub. No.: WO2020/003592
PCT Pub. Date: Jan. 2, 2020

(65) Prior Publication Data
US 2020/0385594 A1    Dec. 10, 2020

(30) Foreign Application Priority Data

Jun. 25, 2018  (JP) .................................. 2018-119455

(51) Int. Cl.
*C09D 11/38*    (2014.01)
*B41J 2/01*    (2006.01)
(Continued)

(52) U.S. Cl.
CPC .................. *C09D 11/38* (2013.01); *B41J 2/01* (2013.01); *C08K 5/3445* (2013.01);
(Continued)

(58) Field of Classification Search
CPC ....... C09D 11/38; C09D 11/04; C09D 11/101; C09D 11/322; C09D 11/36; C09D 11/52;
(Continued)

(56) References Cited

U.S. PATENT DOCUMENTS 6,543,890 B1 *  4/2003  Ylitalo ............... B41J 11/00212
                                                  347/102
2006/0139426 A1 *  6/2006  Doi ........................ C09D 11/54
                                                  106/31.77
(Continued)

FOREIGN PATENT DOCUMENTS

EP      1 676 894 A1    7/2006
JP      2006-188551 A   7/2006
(Continued)

OTHER PUBLICATIONS

English Machine Translation of JP-2006335995-A (Year: 2006).*
(Continued)

*Primary Examiner* — Jennifer A Smith
*Assistant Examiner* — Jeffrey Eugene Barzach
(74) *Attorney, Agent, or Firm* — Crowell & Moring LLP

(57) ABSTRACT

The purpose of the present invention is to provide an ink for ink-jet printers, the ink being able to be reduced in the content of an electroconductive agent and having low resistance. The ink for ink-jet printers of a charge control type according to the present invention, which is provided in order to overcome the problem, is characterized by comprising a resin, a pigment, an electroconductive agent, and a nonaqueous solvent, the electroconductive agent having a salt structure which generates an anion and a cation in the nonaqueous solvent, the anion having a trifluoromethyl-sulfonyl group and the cation being a quaternary ammonium cation or having an unsaturated heterocyclic structure.

6 Claims, 2 Drawing Sheets

(51) Int. Cl.

| | |
|---|---|
| *C08K 5/3445* | (2006.01) |
| *C08K 5/3462* | (2006.01) |
| *C09D 11/04* | (2006.01) |
| *C09D 11/101* | (2014.01) |
| *C09D 11/322* | (2014.01) |
| *C09D 11/36* | (2014.01) |

(52) U.S. Cl.
CPC ............ *C08K 5/3462* (2013.01); *C09D 11/04* (2013.01); *C09D 11/101* (2013.01); *C09D 11/322* (2013.01); *C09D 11/36* (2013.01)

(58) Field of Classification Search
CPC ........ B41J 2/01; C08K 5/3445; C08K 5/3462; C08K 2201/001; C08K 5/42; Y02E 10/549; B41M 5/00
See application file for complete search history.

(56) References Cited

U.S. PATENT DOCUMENTS

| | | | |
|---|---|---|---|
| 2008/0066239 | A1 | 3/2008 | Zhu et al. |
| 2010/0213455 | A1 | 8/2010 | James et al. |
| 2013/0059135 | A1 | 3/2013 | Chun et al. |
| 2014/0065381 | A1 | 3/2014 | De Saint Romain et al. |
| 2016/0333211 | A1* | 11/2016 | Miyajima ............ C09D 11/107 |
| 2017/0022378 | A1* | 1/2017 | Iio ......................... B33Y 70/10 |

FOREIGN PATENT DOCUMENTS

| | | | |
|---|---|---|---|
| JP | 2006-206686 A | | 8/2006 |
| JP | 2006335995 A | * | 12/2006 |
| JP | 2009-120631 A | | 6/2009 |
| JP | 2010-503741 A | | 2/2010 |
| JP | 2011-504650 A | | 2/2011 |
| JP | 2013-532195 A | | 8/2013 |
| JP | 2014-513161 A | | 5/2014 |
| JP | 2016-117845 A | | 6/2016 |
| JP | 2016117815 A | * | 6/2016 |
| JP | 2018095846 A | * | 6/2018 |

OTHER PUBLICATIONS

English Machine Translation of JP-2018095846-A (Year: 2018).*
"3-Methyl-N-Butylpyridinium Trifluoromethanesulfonate." ChemicalBook, www.chemicalbook.com/ChemicalProductProperty_EN_CB6534019.htm. Accessed Aug. 22, 2023. (Year: 2023).*
"1-Butylpyridinium Triflate." ChemSpider, www.chemspider.com/Chemical-Structure.2016004.html. Accessed Aug. 22, 2023. (Year: 2023).*
English machine translation of JP-2016117815-A (Year: 2016).*
Extended European Search Report issued in European Application No. 19824593.8 dated Feb. 18, 2022 (six (6) pages).
International Search Report (PCT/ISA/210) issued in PCT Application No. PCT/JP2019/006203 dated Mar. 26, 2019 with English translation (five pages).
Japanese-language Written Opinion (PCT/ISA/237) issued in PCT Application No. PCT/JP 2019/006203 dated Mar. 26, 2019 (four pages).

* cited by examiner ized. Is is preferable that the content of the resin in
INK FOR INK-JET PRINTER OF CHARGE CONTROL TYPE

TECHNICAL FIELD

The present invention relates to an ink for ink-jet printers of a charge control type.

BACKGROUND ART

Ink-jet printers of a charge control type are used in wide fields, such as food and electronic components, for printing expiration date, use-by date, manufacturing number, etc. An ink for the ink-jet printers of a charge control type mainly includes a resin, a colorant, a conductive agent, and a solvent. In addition to them, an additive, such as a leveling agent for controlling the shape of a print dot, is added.

The colorant is added for color development of the ink. The resin is added for holding members, such as the colorant, to a printed portion. As the leveling agent, a silicone compound is usually used.

In the ink-jet printers of a charge control type, ink particles ejected from a nozzle are charged and deflected by a deflection electrode, so that the ink is sprayed on a print surface. Therefore, it is necessary to charge the ink. The conductive agent is added for properly charging an ink drop. Specifically, the conductive agent has a function to improve the conductivity of the ink and to reduce the resistance thereof.

As the conductive agent, an organic substance having a salt structure is generally used.

Patent Literature 1 discloses an ink composition for ink-jets that includes an organic solvent such as acetone or propyleneglycol methylether, a solvent-soluble binder resin, and a water-insoluble quinone dye. It is also disclosed that a lithium trifluoromethanesulfonate can be used as the conductive agent.

Patent Literature 2 discloses a compound that includes, as a conductive ink for preparing an organic photovoltaic cell, an organic semiconductor, an organic solvent, and an additive for increasing conductivity. It is disclosed that as a conductive additive, an alkali metal salt or an organic salt, the anion of which is made of triflate(trifluoromethanesulfonate) or bis(trifluoromethylsulfonyl)imide, can be used.

CITATION LIST

Patent Literature

Patent Literature 1: Japanese Unexamined Patent Application Publication (Translation of PCT Application) No. 2010-503741
Patent Literature 2: Japanese Unexamined Patent Application Publication (Translation of PCT Application) No. 2011-504650

SUMMARY OF INVENTION

Technical Problem

A resin is mainly responsible for the abrasion resistance and the adhesion of the printing of an ink for ink-jet printers, and the resin can be added until a viscosity becomes one acceptable for printing. When the rate of a colorant or a conductive agent in the ink is increased, the rate of a resin added to ensure the physical strength of printing is decreased, and hence the abrasion resistance and the adhesion are decreased. It is necessary to add the colorant for ensuring visibility. Therefore, it is difficult to reduce the content of the colorant. So, it is desired to reduce the addition rate of the conductive agent while maintaining low resistance.

Since the conductive agent disclosed in Patent Literature 1 is an inorganic substance whose cation is an alkali metal or the like, there is a problem with the solubility in the resin and solvent.

The conductive compound disclosed in Patent Literature 2 is intended to form circuits, etc., and does not include the resin and colorant to be included in an ink for ink-jets printers. Therefore, the challenge of achieving both high adhesion and high abrasion resistance, which can be obtained by the addition of a resin, and low resistance, which can be obtained by the addition of a conductive agent, does not occur.

So, an object of the present invention is to provide an ink for ink-jet printers that is capable of reducing the addition rate of a conductive agent and has low resistance.

Solution to Problem

In order to solve the aforementioned problem, an ink for ink-jet printers of a charge control type according to the present invention includes a resin, a pigment, a conductive agent, and a non-aqueous solvent, in which: the conductive agent has a salt structure that generates an anion and a cation in the non-aqueous solvent; the anion has a trifluoromethylsulfonyl group; and the cation is a quaternary ammonium cation or has an unsaturated heterocyclic structure.

Advantageous Effects of Invention

According to the present invention, the addition rate of the conductive agent can be reduced, and an ink for ink-jet printers having low resistance can be provided.

DESCRIPTION OF EMBODIMENTS

Figure 1:
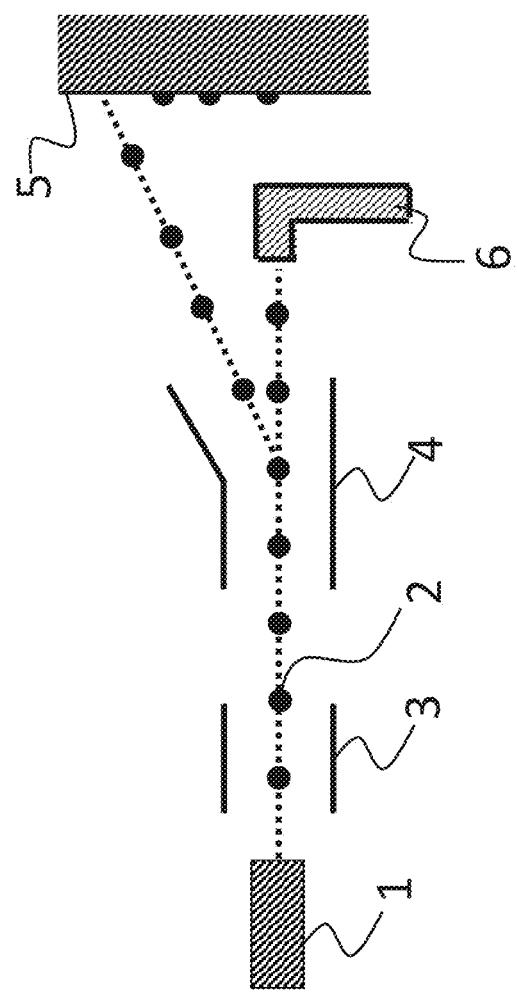
FIG. 1 is a schematic view showing a printing process by an ink-jet printer of a charge control type.

Hereinafter, embodiments of the present invention will be described with reference to the drawings.
1. Ink for Ink-Jet Printers
An ink includes a resin, a colorant, a non-aqueous solvent, and a conductive agent. The ink is formed by starring them with a stirrer chip, an overhead stirrer, or the like to make each other compatible.
<Resin>
The type of the resin included in the ink is not particularly limited as long as the resin is dissolved in the solvent, and the resin is selected in consideration of adhesion to a material to be printed (printed material), abrasion resistance, etc. Specifically, an acrylic resin, a styrene acrylic resin, a polyvinyl butyral resin, a polyester resin, a vinyl acetate containing chlorine, and a mixture of these resins can be used as the resin. It is preferable that the weight average molecular weights of these resins are from thousands to about 20,000. Is is preferable that the content of the resin in the ink is 5 mass % or more, from the viewpoint of ensuring the abrasion resistance and adhesion of printing. In order to make the viscosity a printable viscosity, it is preferable that the content of the resin in the ink is 15 mass % or less.

<Colorant>

As the colorant, a dye or a pigment can be used.

(Dye)

The dye is not particularly limited as long as it is a material that is dissolved in the solvent to be used. Specifically, the following dyes are mentioned. Examples of a black dye includes oil Black HBB (C. I. Solvent Black 3), Valifast Black 3804 (C. I. Solvent Black 34), Spirit Black SB (C. I. Solvent Black 5), Oleosol Fast Black RL (C. I. Solvent Black 27), Aisen Sot Black 8 (C. I. Solvent Black 7), and Orasol Black CN (C. I. Solvent Black 28), etc.

Examples of a red dye include oil Red 5B (C. I. Solvent Red 27), Valifast Red 1306 (C. I. Solvent Red 109), Oleosol Fast Red BL (C. I. Solvent Red 132), Aisen Sot Red 1 (C. I. Solvent Red 24), Orasol Red 3GL (C. I. Solvent Red 130), Filamid Red GR (C. I. Solvent Red 225), etc.

Examples of a yellow dye include oil Yellow 129 (C. I. Solvent Yellow 29), Oleosol Brilliant Yellow 5G (C. I. Solvent Yellow 150), Aisen Sot Yellow 1 (C. I. Solvent Yellow 56), Orasol Yellow 3R (C. I. Solvent Yellow 25), etc.

Examples of a blue dye include oil Blue 2N (C. I. Solvent Blue 35), Valifast Blue 1605 (C. I. Solvent Blue 38), Oleosol Fast Blue ELN (C. I. Solvent Blue 70), Aisen Sot Blue 1 (C. I. Solvent Blue 25), Orasol Blue GN (C. I. Solvent Blue 67), etc.

(Pigment)

When the pigment is black, carbon black can be used. When the pigment is white, titanium dioxide, zinc oxide, or the like can be used. When the pigment is red, cadmium red, bengala (ferric oxide), quinacridone red, or the like can be used. When the pigment is yellow, chrome yellow, cadmium yellow, nickel titanium yellow, or the like can be used. When the pigment is blue, prussian blue, copper phthalocyanine, or the like can be used. When the pigment is green, phthalocyanine green, a mixture of chrome yellow and berlin blue, titanium cobalt green, or the like can be used.

It is preferable that the pigment other than the white pigment is ground to have an average particle size of 100 nm to 1000 nm and is used together with a suitable dispersant. Since the white pigment that is too small decreases a contrast ratio, the average particle size is preferably 200 nm or more, and the pigment is added together with a dispersant.

<Non-Aqueous Solvent>

The non-aqueous solvent is not particularly limited as long as it dissolves the resin and reduces the viscosity of the ink to a printable viscosity, and an organic solvent, such as, for example, an aroma group, ester group, ketone group, hydrocarbon group, alcohol group, or glycol group, can be used. Note that in ink-jet printers of a charge control type, the viscosity of ink is controlled to about 1 to 5 mPa·S at 20° C. This is because if the viscosity is above this, it is difficult for the ink to eject from a printer head.

As the solvent for the inks of ink-jet printers of a charge control type, ketone solvents, such as 2-butanone (common name is methylethylketone (MEK)), acetone, and methylisopropylketone, are often used. Since these solvents easily dissolve a resin and have a large vapor pressure, they dry quickly after printing. Therefore, it is preferable that the resin and the conductive agent have a high solubility in the ketone solvents. In addition to the ketone solvents, dimethoxyethane or ethanol may be used as the solvent.

<Conductive Agent>

The conductive agent has a salt structure that generates an anion and a cation in the non-aqueous solvent, in which the anion has a trifluoromethylsulfonyl group ($CF_3SO_2$), and the cation is a quaternary ammonium cation or has an unsaturated heterocyclic structure.

(Anion)

If the content ratio of the conductive agent in the ink is increased, the content ratio of the resin in the ink (in printing), the resin having been added to ensure the physical strength of printing, is decreased, and hence the abrasion resistance and adhesion of the printing are decreased. Therefore, it is necessary to reduce the addition rate of the conductive agent as much as possible.

As a result of our examination, it has been found that, of the salt structure constituting the conductive agent, the stronger the acidity of an acid produced with a proton bonded to the anion, the smaller the addition amount and the higher the conductivity. One of the parameters showing the strength of an acid is a Hammett acidity function, and it has been found that an acid having the acidity function of −12 or more is preferred.

It is also necessary to hardly undergo an oxidation or reduction reaction from a substance in the ink composition. Further, it is also required that the acid has no oxidation power to a substance in the ink composition, unlike a strong acid such as perchloric acid or nitric acid. It is also necessary that the acid is chemically stable as an anion and hardly shows reducibility or nucleophilicity. That is, an acid that is strongly acidic and chemically stable is desired. An example of an anion that meets these requirements is an anion having a trifluoromethylsulfonyl group ($CF_3SO_2$). Specifically, examples of the anion include trifluoromethanesulfonate (conjugate base of trifluoromethanesulfonic acid) represented by $CF_3SO_3^-$, a conjugate base of bis(trifluoromethanesulfonyl)imide represented by $(CF_3SO_2)_2N^-$, a conjugate base of tris(trifluoromethaneslufonyl)methide represented by $(CF_3SO_2)_3C^-$, etc.

(Cation)

It is necessary to use a conductive agent that is dissolved in the non-aqueous solvent. Since a ketone solvent, such as MEK, is mainly included in the ink, it is preferable that the conductive agent is also dissolved in a ketone solvent, such as MEK. In order to improve the solubility in the solvent, an organic substance, not an inorganic substance such as an alkali metal like Li or Na, is used as the cation in the present invention. Specifically, the cation is a quaternary ammonium cation (cation having a quaternary ammonium salt structure) having 1 to 4 alkyl chains, or a cation having an unsaturated heterocycle.

Examples of the cation having a quaternary ammonium salt structure include an amine having an alkyl chain having a linear or branched structure, and an amine having a heterocyclic structure, such as pyrrole or pyridine.

It is also preferable that the unsaturated heterocyclic structure contains nitrogen, and it is further preferable that the unsaturated heterocyclic structure is a monocyclic unsaturated six-membered ring structure or a monocyclic unsaturated five-membered ring structure.

In order to reduce the addition rate to the ink, it is better that the molecular weight of the cation is smaller. A tetraalkylammonium salt (the cation is a tetraalkylammonium ion), which is often used as the conductive agent of an ink, has higher solubility in an organic solvent as its alkyl group is longer. Therefore, it is preferable that in an ink for ink-jet printers of a charge control type, a tetraalkylammonium ion having an alkyl group having four or more carbon atoms is used as the cation. However, if the tetraalkylammonium ion having an alkyl group having four or more carbon atoms is used as the cation, the molecular weight thereof is too high.

When the molecular weight of an element is rounded off to the nearest whole number and calculated as an integer, the molecular weight becomes 308 in the case where the alkyl group contains four carbon atoms, becomes 420 in the case of six carbon atoms, becomes 532 in the case of eight carbon atoms, and becomes 392 also in the case of tetraphenylamine; and the molecular weight becomes as high as 464 in the case of a phenyl group into which a fluoro group has been introduced in order to improve the solubility in an organic solvent.

On the other hand, the molecular weight can be reduced by using a cation having a monocyclic unsaturated heterocycle. For example, when an alkyl group is not included in the molecules of an imidazolium structure and a pyrrolium structure, each having a monocyclic unsaturated five-membered ring structure, the molecular weights thereof are as low as 69 and 72, respectively. When an alkyl group is not included in the molecule of a pyridinium structure having a monocyclic unsaturated six-membered ring structure, the molecular weight thereof is as low as 80. With these structures, the solubility in an organic solvent can be ensured by introducing one or two alkyl groups to the nitrogen in their molecules. However, the solubility in an alcohol solvent, such as ethanol, is decreased even when the alkyl group is too long. Therefore, when the unsaturated heterocyclic structure is a pyridinium structurer, it is preferable that the total carbon number of the hydrocarbon group having a linear or branched structure bonded to the nitrogen of the pyridinium structure is 4 to 10. When the unsaturated heterocyclic structure is an imidazolium structure, it is preferable that the total carbon number of the hydrocarbon groups having a linear or branched structure bonded to the nitrogen of the imidazolium structure is 2 to 8. When the unsaturated heterocyclic structure is a pyrrolinium structure, it is preferable that the total carbon number of the hydrocarbon group having a linear or branched structure bonded to the nitrogen of the pyrrolinium structure is 4 to 8.

By using the cations described above, the solubility in a non-aqueous solvent often used in inks for ink-jet printers is improved.

Further, by using a cation having a nitrogen-containing unsaturated heteromonocyclic ring, a conductive agent having an acid salt structure, which has a low molecular weight and has a trifluoromethylsulfonyl group, can be obtained.

Next, a site to which an alkyl group is to be introduced will be described. Since the nitrogen at the first position is quaternized, the hydrophilicity is high. In other words, the hydrophobicity is low, and hence in order to improve the solubility in a hydrophobic organic solvents such as MEK at the nitrogen site, it is suitable to introduce a hydrophobic alkyl group to the nitrogen at the first position.

As a site to which an alkyl group is to be introduced, other than the first position, a site away from the nitrogen is suitable. The third and fourth positions are more preferred than the second position. This is because the thermal stability of the salt structure can be enhanced by making it easy for an anion to approach the vicinity of the nitrogen. If an alkyl group is present at the second position, steric hindrance occurs and the approach of an anion to the nitrogen is hampered, and hence the thermal stability of the salt tends to decrease. Since there is the possibility that the ink may be heated to tens of degrees near a part inside an ink-jet printer, such as a pump, that generates heat, it is important to ensure the thermal stability. Therefore, also in order to ensure the thermal stability, it is preferable to introduce an alkyl group to, other than the first position, a site away from the nitrogen, such as the third position or the fourth position.

From the above, when the unsaturated heterocyclic structure is a pyridinium structure, hydrocarbon groups having a linear or branched structure are bonded to the first and third positions of the pyridinium structure, as shown in Chemical formula 1, and it is preferable that the total carbon number of the hydrocarbon groups bonded to the first and third positions is 4 to 10.

[Formula 1]

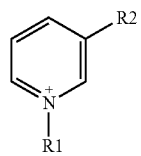

Chemical formula 1

In Formula 1, R1 and R2 are each independently an alkyl group, and the total carbon number of R1 and R2 is 4 or more and 10 or less. When the unsaturated heterocyclic structure is an imidazolium structure, hydrocarbon groups having a linear or branched structure are bonded to the first and third positions of the imidazolium structure, as shown in Chemical formula 2, and it is preferable that the total carbon number of the hydrocarbon groups bonded to the first and third positions is 2 to 8.

[Formula 2]

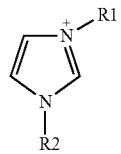

Chemical formula 2

In Chemical formula 2, R1 and R2 are each independently an alkyl group, and the total carbon number of R1 and R2 is 2 or more and 8 or less.

When the unsaturated heterocyclic structure is a pyrrolinium structure, two hydrocarbon groups having a linear or branched structure are bonded to the first position of the pyrrolinium structure shown in Chemical formula 3, and it is preferable that the total carbon number of the two hydrocarbon groups bonded to the first position is 4 to 8.

[Formula 3]

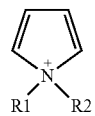

Chemical formula 3

In Chemical formula 3, R1 and R2 are each independently an alkyl group, and the total carbon number of R1 and R2 is 4 or more and 8 or less.

Therefore, as the conductive agent, compounds represented by the following compound group 1, compound group 2, and compound group 3 are preferred.

[Formula 4]

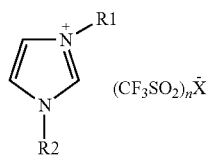

Compound group 1

In Compound group 1, R1 and R2 are each independently an alkyl group, and the total carbon number of R1 and R2 is 2 or more and 8 or less. n is an integer of 1 or more and 3 or less, and X is oxygen when n is 1, X is nitrogen when n is 2, and X is carbon when n is 3.

[Formula 5]

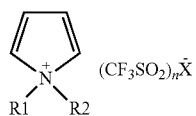

Compound group 2

In Compound group 2, R1 and R2 are each independently an alkyl group, and the total carbon number of R1 and R2 is 4 or more and 8 or less. n is 1 or more and 3 or less, and X is oxygen when n is 1, X is nitrogen when n is 2, and X is carbon when n is 3.

[Formula 6]

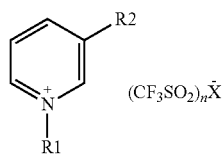

Compound group 3

In Compound group 3, R1 and R2 are each independently an alkyl group, and the total carbon number of R1 and R2 is 4 or more and 10 or less. n is 1 or more and 3 or less, and X is oxygen when n is 1, X is nitrogen when n is 2, and X is carbon when n is 3.

When the molecular weights of Compound group 1, Compound group 2, and Compound group 3 are compared to each other, the molecular weights of Compound group 1 are 97 to 181, those of Compound group 2 are 180 to 292, and those of Compound group 3 are 136 to 220. Therefore, from the viewpoint of the solubility in a solvent, it is particularly preferable to use Compound group 1 as the conductive agent.

As the ink for ink-jet printers, a light-curable ink that is cured by being irradiated with light such as UV light may be used. The light-curable ink includes a solvent, a resin, a colorant, a conductive agent, a resin precursor, a polymerization initiator, etc. The same solvent, resin, colorant, and conductive agent as those in the ink described above can be used.

The resin precursor has a polymerizable double bond. By being irradiated with light, such as UV light, in the presence of the polymerization initiator, the resin precursor becomes a polymer and is cured.

As the resin precursor, an acrylic monomer or a methacrylic monomer is mentioned. As the acrylic monomer, for example, methyl acrylate, ethyl acrylate, propyl acrylate, butyl acrylate, hexyl acrylate, octyl acrylate, decyl acrylate, dodecyl acrylate, stearyl acrylate, isopropyl acrylate, isobutyl acrylate, 2-ethylbuthyl acrylate, 2-ethylhexyl acrylate, cyclohexyl acrylate, cyclooccthyl acrylate, cyclodecyl acrylate, methoxypolyethyleneglycol acrylate, phenoxypolyethyleneglycol acrylate, polyethyleneglycol diacrylate, dipropyleneglycol diacrylate, 1,6-hexanediol diacrylate, 1,8-octanediol diacrylate, 1,10-decanediol diacrylate, 1,12-dodecanediol diacrylate, trimethylolpropane triacrylate, etc., can be used. As the methacrylic monomer, for example, methyl methacrylate, ethyl methacrylate, propyl methacrylate, butyl methacrylate, hexyl methacrylate, octyl methacrylate, decyl methacrylate, dodecyl methacrylate, stearyl methacrylate, isopropyl methacrylate, isobutyl methacrylate, 2-ethylbutyl methacrylate, 2-ethylhexyl methacrylate, cyclohexyl methacrylate, cyclooctyl methacrylate, cyclodecyl methacrylate, methoxypolyethyleneglycol methacrylate, phenoxyethyleneglycol methacrylate, ethyleneglycol dimethacrylate, diethyleneglycol dimethacrylate, triethyleneglycol dimethacrylate, polyethyleneglycol dimethacrylate, 1,6-hexanediol dimethacrylate, 1,8-octanediol dimethacrylate, 1,10-decanediol dimethacrylate, glycerin dimethacrylate, polypropylene dimethacrylate, etc., can be used.

The polymerization initiator is selected according to the type of a polymerization reaction. Examples of the structure of the initiator includes a peroxide group, an alkylphenone group, an oxime ester group, etc. As the peroxide, for example, azobis(isobutyronitrile), benzoyl peroxide, di-tert-butylperoxide, etc., can be used; as the alkylphenone group, 2,2-dimethoxy-1,2-diphenylpropane-1-one, 2-hydroxy-2-methyl-1-phenyl-propane-1-one, 2,4,6-trimethylbenzoyl-diphenyl-phosphine oxide, etc., can be used; and as the oxime ester group, 1,2-octanedione, 1-[4-(phenylthio)-2-(orthobenzoyloxime)], etc., can be used.

2. Ink-Jet Printer

By putting the ink described above into an ink-jet printer, desired printing can be provided.

A printing process from ink ejection to landing in an ink-jet printer of a charge control type is shown in FIG. 1. An ink drop 2 ejected from a nozzle 1 is charged by to charging electrode 3, and then its direction is controlled by a deflection electrode 4, thereby landing on a base material to be printed 5. An ink that is not printed is collected from a gutter 6 and returned to an ink tank (not shown in FIG. 1).

The dot size of the printed ink is about 300 to 400 μm. When the base material to be printed is the surface of a resin such as polypropylene (PP) or polyethylene (PE), the hydrophobicity of the base material to be printed is high, and hence the dot size is as small as about 300 to 350 μm. On the other hand, when printing is made on the surface of an aluminum can or a glass bottle that has high hydrophilicity, the dot size is about 350 to 400 μm.

EXAMPLES

Examples of the present invention will be shown below.
<Preparation of Inks 1 to 26>

By mixing titanium dioxide powder having an average particle size of 300 nm (100 g), polyvinyl butyral resin having a hydroxyl value of 130 and a weight average molecular weight of 15000 (32 g), and 2-butanone (308 g) with a bead mill, a dispersion liquid of titanium dioxide was prepared. To this, an acrylic resin having an acid value of 74 and a weight average molecular weight of 10000 (100 g), a polydimethylsiloxane derivative having polyethoxy chains on both the ends represented by the following Chemical formula 4 (2 g), and a conductive agent were added.

[Formula 7]

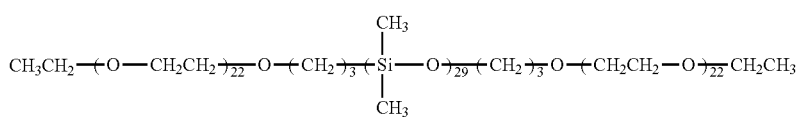

Chemical formula 4

As the conductive agent, compounds 1 to 17 represented below were used, in which the addition amount of them was set to 3 g or 5 g.

[Formula 8]

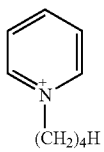

Compound 1

[Formula 9]

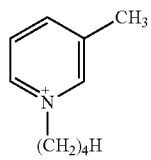

Compound 2

[Formula 10]

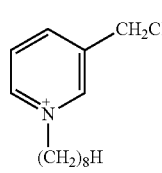

Compound 3

[Formula 11]

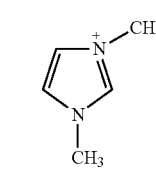

Compound 4

[Formula 12]

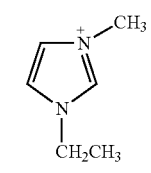

Compound 5

[Formula 13]

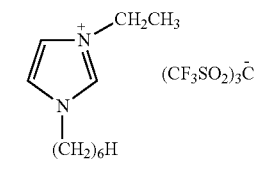

Compound 6

-continued

[Formula 14]

Compound 7

[Formula 15]

Compound 8

[Formula 16]

Compound 9

[Formula 17]

Compound 10

[Formula 18]

Compound 11

[Formula 19]

$\overset{+}{N}[(CH_2)_4H]_4$   Br⁻

Compound 12

[Formula 20]

$\overset{+}{N}[(CH_2)_4H]_4$   Cl⁻

Compound 13

To this, 455 g of 2-butanone were added when the addition amount of the conductive agent was 3 g, and 453 g of 2-butanone were added when the addition amount of the conductive agent was 5 g. Thereafter, by stirring the mixture until the substances other than the titanium dioxide were dissolved, each of the inks 1 to 26 was prepared in an amount of 1 kg. The compositions of the prepared inks are shown in Table 1. Note that when the addition amount of the conductive agent is 3 g, the addition rate of the conductive agent in the ink is 0.3 mass %, and when the addition amount of the conductive agent is 5 g, the addition rate of the conductive agent in the ink is 0.5 mass %.

(100 g) were add, and the mixture was stirred well. In this way, a UV-curable ink 33 was prepared.

TABLE 1

| Ink No. | Pigment | Solvent | Resin | Others | Conductive agent | Addition amount of conductive agent (g) | Resistance (Ω·cm) | Evaluation of printing |
|---|---|---|---|---|---|---|---|---|
| Ink 1 | Titanium dioxide | 2-butanone | Polyvinyl butyral acrylic resin | Polydimethylsiloxane derivative | Compound 1 | 3 | 1270 | good |
| Ink 2 | | | | | Compound 1 | 5 | 890 | good |
| Ink 3 | | | | | Compound 2 | 3 | 1510 | good |
| Ink 4 | | | | | Compound 2 | 5 | 1060 | good |
| Ink 5 | | | | | Compound 3 | 3 | 1870 | good |
| Ink 6 | | | | | Compound 3 | 5 | 1310 | good |
| Ink 7 | | | | | Compound 4 | 3 | 1090 | good |
| Ink 8 | | | | | Compound 4 | 5 | 770 | good |
| Ink 9 | | | | | Compound 5 | 3 | 1370 | good |
| Ink 10 | | | | | Compound 5 | 5 | 960 | good |
| Ink 11 | | | | | Compound 6 | 3 | 980 | good |
| Ink 12 | | | | | Compound 6 | 5 | 680 | good |
| Ink 13 | | | | | Compound 7 | 3 | 1460 | good |
| Ink 14 | | | | | Compound 7 | 5 | 1020 | good |
| Ink 15 | | | | | Compound 8 | 3 | 1970 | good |
| Ink 16 | | | | | Compound 8 | 5 | 1410 | good |
| Ink 17 | | | | | Compound 9 | 3 | 2660 | bad |
| Ink 18 | | | | | Compound 9 | 5 | 1870 | normal |
| Ink 19 | | | | | Compound 10 | 3 | 2320 | bad |
| Ink 20 | | | | | Compound 10 | 5 | 1620 | normal |
| Ink 21 | | | | | Compound 11 | 3 | 2310 | bad |
| Ink 22 | | | | | Compound 11 | 5 | 1620 | normal |
| Ink 23 | | | | | Compound 12 | 3 | 3100 | bad |
| Ink 24 | | | | | Compound 12 | 5 | 2170 | bad |
| Ink 25 | | | | | Compound 13 | 3 | 2880 | bad |
| Ink 26 | | | | | Compound 13 | 5 | 2010 | normal |
| Ink 27 | Titanium dioxide | 2-butanone | Polyvinyl butyral polyester | Polydimethylsiloxane derivative | Compound 1 | 3 | 1280 | good |
| Ink 28 | | | | | Compound 2 | 3 | 1540 | good |
| Ink 29 | | | | | Compound 3 | 3 | 1890 | good |
| Ink 30 | Carbon black | MEK | Polyvinyl butyral acrylic resin | Polydimethylsiloxane derivative | Compound 1 | 3 | 1240 | good |
| Ink 31 | | | | | Compound 2 | 3 | 1470 | good |
| Ink 32 | | | | | Compound 3 | 3 | 1800 | good |
| Ink 33 | Carbon black | MEK | Polyvinyl butyral | Resin precursor: 1,6-hexanediol diacrylate, Dipropyleneglycol diacrylate Polymerization initiator: 2,4,6-trimethylbenzoyl-diphenyl-phosphine oxide | Compound 1 | 100 | 1800 | good |

<Preparation of Inks 27 to 29>

Inks 27, 28, and 29 were prepared in the same way as the inks 1, 3, and 5, respectively, except that instead of the acrylic resin having an acid value of 72 and a weight average molecular weight of 10000 (100 g), polyester having a weight average molecular weight of 3000 (the dicarboxylic acid unit had a ratio of isophthalic acid:terephthalic acid=1: 1, the diol unit was propyleneglycol) was used.

<Preparation of Inks 30 to 32>

Inks 30, 31, and 32 were prepared in the same way as the inks 1, 3, and 5, respectively, except that instead of the titanium dioxide powder having an average particle size of 300 nm (100 g), carbon black powder having an average particle size of 150 nm (50 g) and MEK (50 g) were used.

<Preparation of Ink 33>

By mixing carbon black powder having an average particle size of 150 nm (50 g), polyvinyl butyral resin having a hydroxyl value of 130 and a weight average molecular weight of 15000 (30 g), and MEK (570 g) with a bead mill, a dispersion liquid of carbon black was prepared. To this, 1,6-hexanediol diacrylate that is a resin precursor (100 g), dipropyleneglycol diacrylate (100 g), 2,4,6-trimethyl benzoyldiphenyl phosphine oxide that is a polymerization initiator (50 g), and Compound 5 that is a conductive agent <Measurement of Resistance of Ink>

The resistance of the prepared inks 1 to 33 were measured by using an electric conductivity meter (ES-51 manufactured by HORIBA, LTD.) The results of the measurement are shown in Table 1 and FIG. 2.

Figure 2:
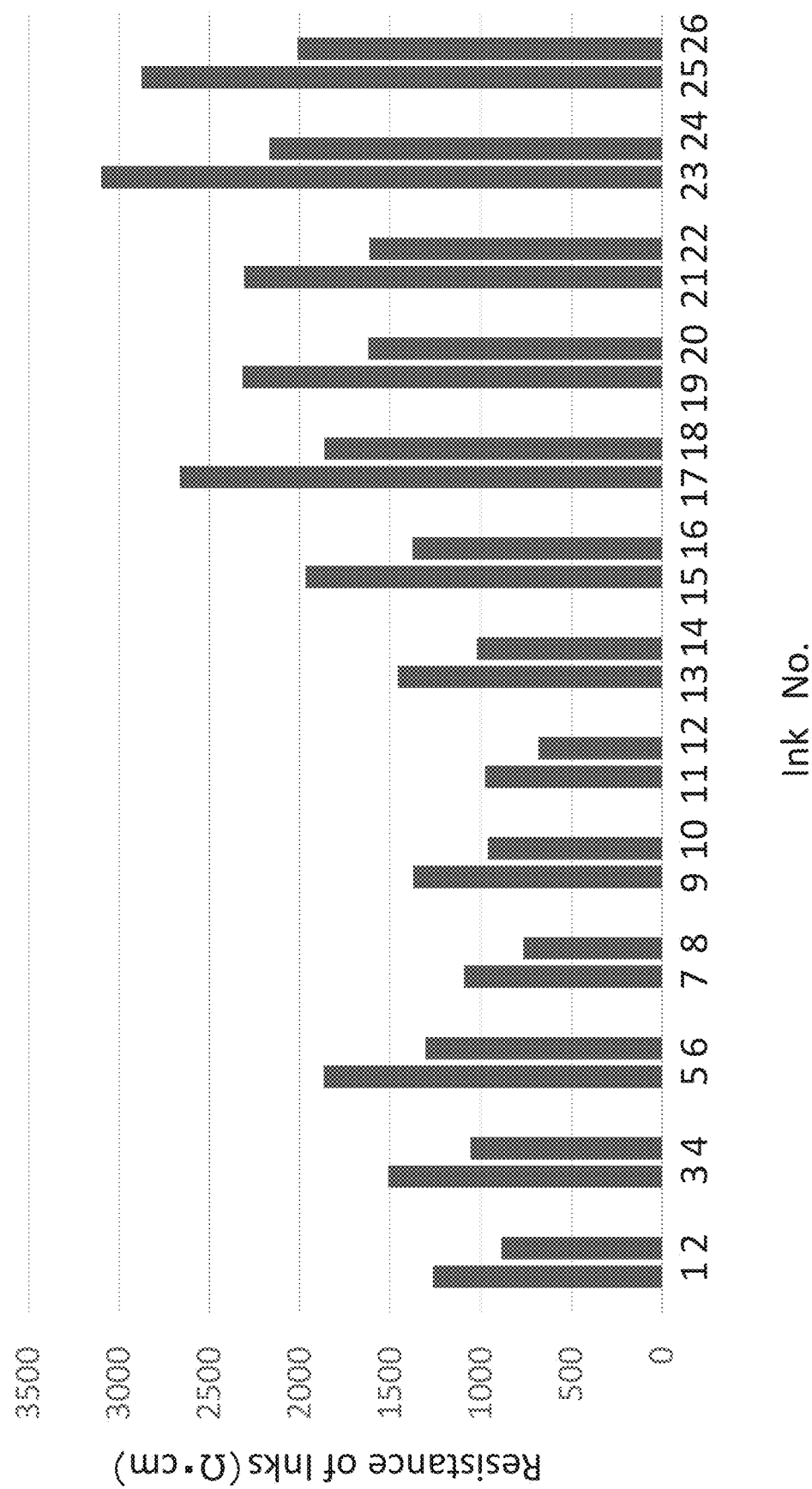
FIG. 2 is a graph showing the resistance of inks of examples and comparative examples.

From Table 1 and FIG. 2, the resistance of the inks 1 to 16 and 27 to 33 were 2000 Ω·cm or less, regardless of whether the addition rate of the conductive agent was 0.3 mass % or 0.5 mass %.

From the results of the inks 1 to 16, it has been found that by using, as the conductive agent, a salt made of any anion of $CF_3SO_3^-$, $(CF_3SO_2)_2N^-$, and $(CF_3SO_2)_3C^-$, and a cation having an imidazolium structure, a pyrrolium structure, or a pyridinium structure, the resistance can be reduced to 2000 Ω·cm or less even if the addition rate is as low as 0.3 mass %.

It is considered that this is because the anions of Compounds 1 to 8 used as the conductive agent contain a conjugate base of trifluoromethanesulfonic acid that is a super-strong acid, so that the degree of dissociation as a salt is large.

From the results of the inks 27 to 29, it has been found that by using, as the conductive agent, a salt made of any anion of $CF_3SO_3^-$, $(CF_3SO_2)_2N^-$, and $(CF_3SO_2)_3C^-$, and a cation having an imidazolium structure, a pyrrolium structure, or a pyridinium structure, the resistance of the ink can be greatly reduced at a low addition rate, even if the type of the resin is changed.

From the results of the inks 30 to 32, it has been found that by using, as the conductive agent, a salt made of any anion of $CF_3SO_3^-$, $(CF_3SO_2)_2N^-$, and $(CF_3SO_2)_3C^-$, and a cation having an imidazolium structure, a pyrrolium structure, or a pyridinium structure, the resistance of the ink can be greatly reduced at a low addition rate, even if the type of the pigment is changed.

On the other hand, the resistance of the inks 17, 19, 21, and 23 to 26 exceeded 2000 Ω·cm. Although the resistance of the inks 18, 19, and 22 were 2000 Ω·cm or less, the addition rates of the conductive agent were as high as 0.5 mass %.

It can be considered that since the inks 17 to 26 used a bromine ion as the anion constituting the conductive agent, the resistance of the inks were high. From the above results, it has become clear that by causing the anion in the chemical structure of the conductive agent to have a structure containing $CF_3SO_2$, the resistance of the ink can be greatly reduced and good printing can be achieved.

<Evaluation of Ink Printing>

Printing operations of the prepared inks 1 to 33 were confirmed by loading the inks into an ink-jet printer (UX Type manufactured by Hitachi Industrial Equipment Systems Co., Ltd.). Results of the printing are shown in Table 1. In Table 1, good printing is represented by "good", normal printing by "normal", and impossible printing by "bad."

With the inks 1 to 16 and 27 to 33 of Examples, it has been confirmed that normal printing can be obtained, which is good printing without disturbance of printing.

With the inks 18, 20, 22, and 26 in which the addition rate of the conductive agent was 5 mass %, normal printing was obtained, but with the ink 24, printing was impossible because of poor charging. Also, with each of the inks 17, 19, 21, 23, and 25 in which the addition rate of the conductive agent was 3 mass %, printing was impossible because of poor charging. It is presumed that since the resistance of inks, with which printing was impossible, were all 2100 Ω·cm or more, it is necessary to set the resistance of an ink to be used to less than 2100 Ω·cm for making the printing possible.

From the above results, it has been found that by using, as the conductive agent, a salt made of any anion of $CF_3SO_3^-$, $(CF_3SO_2)_2N^-$, and $(CF_3SO_2)_3C^-$, and a cation having an imidazolium structure, a pyrrolium structure, or a pyridinium structure, good printing can be achieved even if the addition rate of the conductive agent is low.

With the ink 33, it has also been confirmed that when the obtained printing was irradiated with light of 2 J/cm² using an UV LED lamp capable of emitting 365 nm UV light, the printing was solidified. Therefore, it has become clear that even if a resin precursor is used instead of a resin, the resistance of the ink can be greatly reduced and good printing can be achieved at a low addition rate of a conductive agent containing an anion having a trifluoromethanesulfonic acid structure.

From the above results, it has been found that by using a conductive agent made of an ion having a trifluoromethylsulfonyl group, and a quaternary ammonium cation or a cation having an unsaturated heterocyclic structure, the conductivity of the ink can be improved at a small addition amount. By using this ink, the conductivity of the ink can be improved while maintaining the effects of adding a resin, such as adhesion and abrasion resistance.

LIST OF REFERENCE SIGNS

1 Nozzle
2 Ink drop
3 Charging electrode
4 Deflection electrode
5 Base material to be printed
6 Gutter

The invention claimed is:

1. An ink to be used for ink-jet of a charge control type, the ink comprising a resin, a pigment, a conductive agent, and a non-aqueous solvent,
wherein the conductive agent has a salt structure that generates an anion and a cation in the non-aqueous solvent, and the conductive agent is present in an amount of 0.5 mass % or less,
wherein the anion is $(CF_3SO_2)_3C^-$,
wherein the cation has an unsaturated heterocyclic structure,
wherein the unsaturated heterocyclic structure is a pyridinium structure,
wherein hydrocarbon groups having a linear or branched structure are bonded to a first position and/or a third position of the pyridinium structure,
wherein a total carbon number of the hydrocarbon groups bonded to the first position and/or the third position is 4 or more and 10 or less, and
wherein the non-aqueous solvent comprises a ketone,
wherein the ink further comprises a resin precursor and a polymerization initiator, wherein the resin precursor has a polymerizable double bond, and wherein the ink is an ink that is cured by being irradiated with UV light.

2. The ink to be used for ink-jet printers of a charge control type according to claim 1,
wherein an acidity function of the anion is −12 or more.

3. The ink to be used for ink-jet printers of a charge control type according to claim 1,
wherein the non-aqueous solvent is at least one of 2-butanone, acetone, and methyl isopropyl ketone.

4. The ink to be used for ink-jet printers of a charge control type according to claim 1,
wherein resistance of the ink is 2000 Ω·cm or less.

5. The ink to be used for ink-jet printers of a charge control type according to claim 1,
wherein content of the resin is 5 mass % or more and 15 mass % or less.

6. The ink to be used for ink-jet printers of a charge control type according to claim 1,
wherein viscosity of the ink is 1 to 5 mPa·s at 20° C.

* * * * *